Patented Feb. 5, 1935

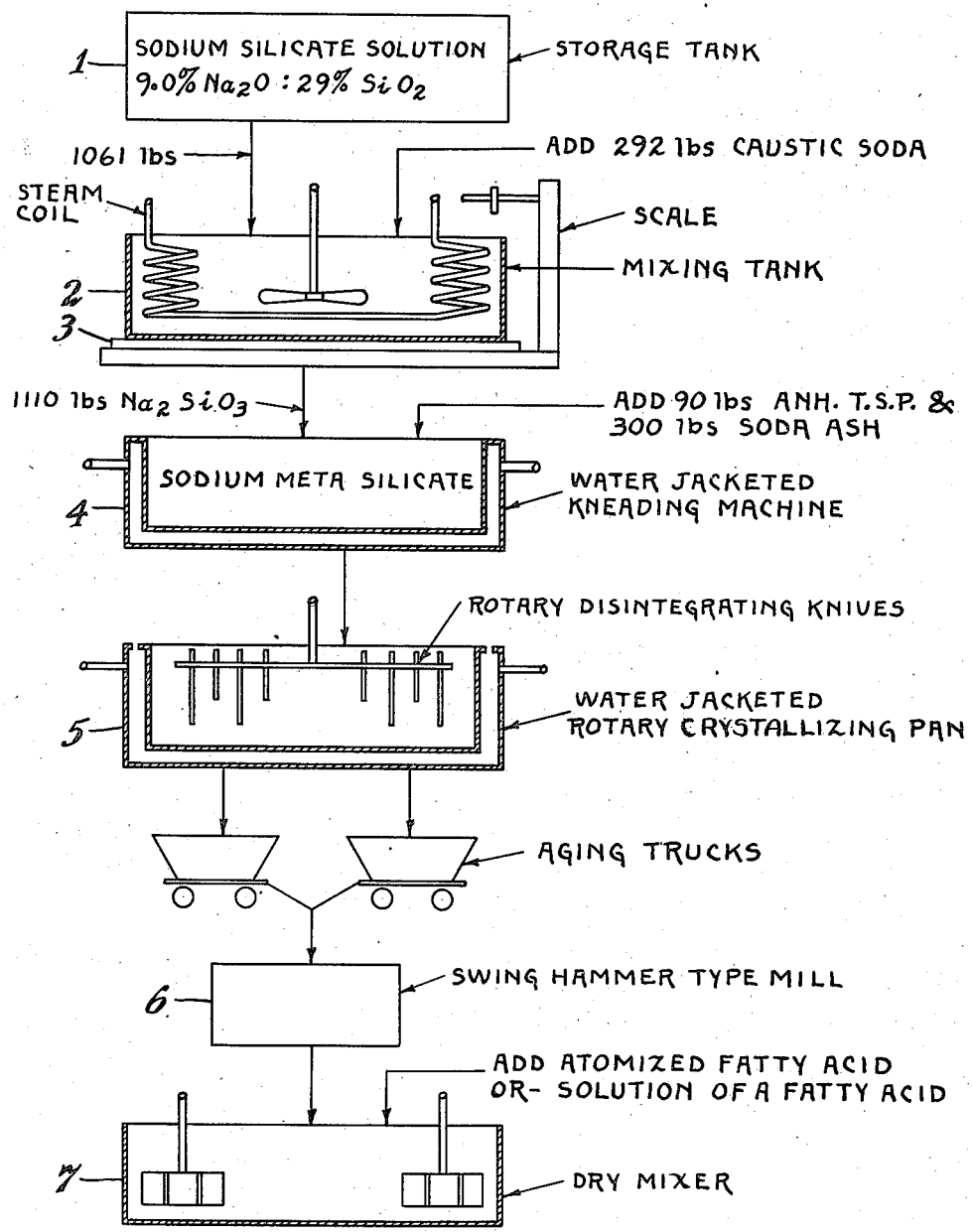

1,989,765

UNITED STATES PATENT OFFICE 1,989,765

SODIUM META SILICATE DETERGENT

Henry V. Moss, St. Louis, Mo., and Foster Dee Snell, Brooklyn, N. Y., assignors to Swann Research, Inc., a corporation of Alabama Application June 25, 1930, Serial No. 463,758

2 Claims. (Cl. 87—5)

This invention relates to a method of making sodium meta silicate, and more particularly, to a solid sodium meta silicate containing embedded particles of alkali salts of weak acids.

It has long been recognized that silicates of alkali metals form colloidal solutions which possess detergent properties. It has been more recently made known that higher alkali ratio silicates are better detergents. Methods of producing high alkali ratio silicates having such physical properties as to permit commercial handling have occupied the attention of many investigators, but their efforts have, for the most part, failed to accomplish the result desired. A product of somewhat similar nature has been produced, but is not suitable for many detergent operations due to the presence of insoluble sodium aluminum silicate.

This invention has as an object a method of making a completely water soluble sodium meta silicate. A further object is a method of making a solid water-soluble sodium meta silicate of such physical properties that it may be handled commercially. A still further object is a method of making a solid water-soluble sodium meta silicate containing embedded particles of alkali metal salts of weak acids.

A still further object is a method of making a solid water soluble sodium meta silicate by a solidification of the entire pregnant mass without the elimination of mother liquor. A still further object is a method of coating comminuted solid sodium meta silicate with liquid or dissolved free fatty acids.

These objects are accomplished by the following described process which involves adding caustic soda to a water solution of low alkali ratio sodium silicate (e. g., Na₂O 3.22 SiO₂) until the ratio of Na₂O to SiO₂ is 1:1 with or without the evaporation of a part of the water, cooling while stirring until sodium meta silicate is obtained in solid form, and grinding the resulting product. While cooling and still liquid, additions may be made of alkali metal salts of weak acid, which become, with continued stirring, thoroughly incorporated in the matrix of sodium meta silicate.

That others may practice our invention, we describe the method in detail below, making reference to the accompanying drawing forming a part of this application, in which the single figure is a typical flow sheet illustrating the process.

From the storage tank 1 we draw 1061 lbs. sodium silicate solution having a content of 9.0% of Na₂O and 29.0% SiO₂, into a mixing tank 2 located on scales 3 and having a stirring device. We heat the silicate solution in any convenient manner, preferably with steam coils and add 292 lbs. caustic soda in solid or flake form. Stirring is continued until all the caustic is dissolved and heating continued until 243 lbs. water have been evaporated, as determined by balancing the mixing tank 2 on the scale 3, or until the resulting solution contains the equivalent of Na₂SiO₃.6H₂O. The solution of sodium meta silicate may be pre-cooled by passing cooling water through the coils previously used for steam; it should not, however, be cooled below 65° C. to avoid solidification in the mixing tank.

The resulting 1110 lbs. of the pre-cooled solution of sodium meta silicate is drawn off into a water jacketed kneading machine 4 preferably of the tilting discharge type, where cooling is continued by means of circulating water in the jacket, while stirring slowly until the product becomes a plastic mass. If it is desired to incorporate alkali metal salts of weak acids, such as sodium carbonate, sodium borate, or trisodium phosphate, they should be introduced when the solution is drawn into the kneading machine. We prefer to use 90 lbs. anhydrous trisodium phosphate and 300 lbs. soda ash.

The plastic sodium meta silicate, with or without the added alkali metal salts of weak acids, having a temperature 58° C. is dumped by tilting the kneading machine into a slowly revolving water jacketed crystallizing pan 5 equipped with two sets of disintegrating knives reaching into the pan on opposite sides and revolving faster than the pan itself. We have found that a desirable speed for the pan is 0.6 R. P. M. and for the knives 9.0. R. P. M. When the former plastic mass has reached a solid state, having a temperature of approximately 40° C., it is dumped from the revolving pan into steel trucks for aging.

After aging approximately a week, the product is milled in a swing hammer type mill 6 being standardized in a dry mixer 7 and preferably spray coated uniformly with 0.1% oleic acid or a solution of other fatty acids in a volatile solvent. The fatty acid or solution of fatty acid is atomized by any suitable means, preferably by a jet of air, and directed upon the surface of the moving mass in the standardizing mixer at such a rate that five minutes is required for coating a 5,000 lb. batch of milled sodium meta silicate in a dry mixer, the stirrer of which revolves at 22 revolutions per minute. The fatty acid is converted at the particle surface into a soap film which prevents hydration and carbonation of the sodium meta silicate. The product may then be packed in containers and shipped.

A typical analysis of the product resulting from the process herein described is as follows:

|  | Per cent |
|---|---|
| Sodium oxide, $Na_2O$ | 34.0 |
| Silicon dioxide, $SiO_2$ | 20.5 |
| Carbon dioxide, $CO_2$ | 8.5 |
| Phosphorus pentoxide, $P_2O_5$ | 2.0 |
| Fatty acid | 0.1 |

While the foregoing is the procedure, we have found to be most satisfactory, it is to be understood that many possible variations, which will readily occur to those versed in the art of chemical manufacture, may be made without departing from the spirit of the invention. For example, as a raw material, any sodium silicate having a $Na_2O:SiO_2$ ratio less than 1:1 may be used providing equivalent correction is made in the quantity of caustic soda added to yield a final product with the proper balance of $Na_2O$ to $SiO_2$. The water evaporated from the sodium meta silicate solution may vary from 0 to a quantity sufficient to yield $Na_2SiO_3$ in the final product.

The addition of alkali metal salts may vary from 0 up to a quantity sufficient to constitute 60% of the final product. Instead of using the kneading machine and crystallizing pan, the sodium meta silicate may be allowed to crystallize in a still pan. Instead of spraying with free fatty acid, an equivalent or greater quantity of powdered soap may be mixed with the final product, as a means of preventing caking, although this will not so effectually reduce the deliquescence of the final product.

The product resulting from the practice, herein described, a solid water soluble sodium meta silicate in dry powdery form, preferably containing embedded particles of alkali metal salts of weak acids, has many uses in detergent operations, for instance, as a buffered alkali in the laundry or in the home, preferably in conjunction with soap whereby the cleaning power of the soap is greatly enhanced without deterioration to the clothes; as a detergent in the home for the cleaning of glass, ceramic and metal ware; as an emulsifier and deflocculating agent for the removal of oil and grease from garage and work shop floors; as a detergent for cleaning bottles and glass ware, as for instance, in dairies and preserving plants; as a protected alkali in textile operations, as for instance in kier boiling, scouring and bleaching, whereby a cleaner, more absorbent textile material is obtained without deterioration of the fibre. It may also be used in the application of dye stuff requiring an alkaline bath, wherein a more uniform color is obtained through the colloidal character of solutions of this product resulting in better dispersion and penetration of the dyestuff and in maintaining at a uniform level, the hydroxyl ion concentration of the dyeing solution.

Our invention provides an economical method for producing a solid sodium meta silicate in dry powdery form, containing embedded particles of alkali metal salts of weak acids, which is completely water soluble and possesses excellent detergent and emulsifying powers as well as water softening properties not heretofore combined in one product. It is known, for instance, that an alkaline solution exhibiting a low interfacial tension to solid or liquid surfaces when combined with soap increases detergency, and we have determined that the product by our process gives a value expressed in dynes per square centimeter in .033% solution against benzene plus .1% soap of 6.02 compared with 6.75 for sodium carbonate, 8.45 for trisodium phosphate, 10.87 for sodium carbonate sodium bicarbonate, 12.88 for commercial liquid sodium silicate ($1Na_2O-3.3SiO_2$) and that a lower value than 6.02 is only given by materials containing free caustic alkali or not possessing like water softening and emulsifying properties.

It is further known that the hydroxyl ion concentration of a detergent solution is preferably high, but that it must not exceed a value that will result in harm to materials being washed, as for instance, corresponding to a pH as given by free caustic alkalies. It is determined that a solution of this material in .033% concentration gives a pH of 10.8 compared with sodium carbonate in like concentration of 10.65, sodium carbonate sodium bicarbonate 10.0, commercial sodium silicate ($Na_2O.3.3SiO_2$) 10.1 and further that the pH of a solution of this product does not appreciably increase with increased concentration shown by a .1% solution giving a pH of 10.8, while the pH of solutions of free caustic alkali exceed a value of 12.0 at like concentrations.

It has further been determined that known materials on the market that give a pH in solution in .033% concentration greater than 10.8 do not possess other combined desirable characteristics as emulsifying power and water softening properties equal to the product herein described. It has further been determined that a 5% water solution of our product is entirely clear, and that there is no evidence of insoluble suspended material, and that after a half hour no precipitate is settled out, while in the case of like and known products there is evidence of insoluble material in suspension in a water solution of 5% concentration which in the same time separates and is sedimented at the bottom of the solution.

It has still further been determined that the enhanced water softening properties of our product increase the detergent value of a soap solution in water of 10 grain hardness to a greater extent when our product is combined in the said soap solution than when like and known products are combined in the soap solution. This has been determined experimentally by washing artifically soiled cloths in various solutions and determining the brightness regained after washing, whereby our product shows a value of 6.25 as compared with values of 3.54 and 2.56 for like and known products tested.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:

1. A method of producing a detergent which consists in providing a sodium silicate solution, adding caustic soda thereto, agitating and heating the solution to evaporate water therefrom and to yield a solution of sodium meta silicate, adding an alkali metal salt of a weak acid, cooling and kneading the solution to form a plastic mass, further cooling with disintegration to form a solid product, pulverizing the product, and spraying it with a higher fatty acid to form a soap film over the surfaces of the particles.

2. A method of producing a detergent which consists in providing a sodium silicate solution, adding caustic soda thereto, agitating and heating the solution to evaporate water therefrom and to yield a solution of sodium meta silicate, cooling and kneading the solution to form a plastic mass, further cooling with disintegration to form a solid product, pulverizing the product, agitating the pulverized product, and spraying it with a higher fatty acid while agitating to form a soap film over the surfaces of the particles.

HENRY V. MOSS.
FOSTER DEE SNELL.